United States Patent
Lin et al.

(10) Patent No.: US 9,360,126 B2
(45) Date of Patent: Jun. 7, 2016

(54) RELIEF VALVE ASSEMBLY WITH ANTI-FROZEN SHIELDING HAT

(71) Applicant: NATIONAL SYNCHROTRON RADIATION RESEARCH CENTER, Hsinchu (TW)

(72) Inventors: Ming Chyuan Lin, Hsinchu (TW); Ming Hsun Tsai, Hsinchu (TW); Chaoen Wang, Hsinchu (TW); Tz Te Yang, Hsinchu (TW)

(73) Assignee: NATIONAL SYNCHROTRON RADIATION RESEARCH CENTER, Hsinchu (TW)

( * ) Notice: Subject to any disclaimer, the term of this patent is extended or adjusted under 35 U.S.C. 154(b) by 80 days.

(21) Appl. No.: 14/264,725

(22) Filed: Apr. 29, 2014

(65) Prior Publication Data
US 2015/0308580 A1 Oct. 29, 2015

(51) Int. Cl.
*F16K 17/04* (2006.01)
*F17C 13/04* (2006.01)
*F16K 27/12* (2006.01)

(52) U.S. Cl.
CPC .............. *F16K 17/0413* (2013.01); *F16K 27/12* (2013.01); *F17C 13/04* (2013.01)

(58) Field of Classification Search
CPC ........................................................ F16K 15/02
USPC ............................................ 137/511–543.23
See application file for complete search history.

(56) References Cited

U.S. PATENT DOCUMENTS

| 737,809 | A | * | 9/1903 | Whitaker | A47K 5/1204 |
| | | | | | 137/493.4 |
| 1,150,743 | A | * | 8/1915 | Butts | F16K 1/46 |
| | | | | | 137/516.29 |
| 2,884,952 | A | * | 5/1959 | Walker | F16K 17/0433 |
| | | | | | 137/494 |
| 3,272,219 | A | * | 9/1966 | Frantz | F16K 15/02 |
| | | | | | 137/112 |
| 3,513,872 | A | * | 5/1970 | Tupper | F16K 15/026 |
| | | | | | 137/484.2 |

(Continued)

FOREIGN PATENT DOCUMENTS

| JP | 63-96367 | 4/1988 |
| JP | 07-004357 | 1/1995 |

(Continued)

OTHER PUBLICATIONS

Office Action of TW103132720, with its translation, dated Mar. 10, 2016, 10 pages.

*Primary Examiner* — Craig Schneider
*Assistant Examiner* — Daniel P Donegan
(74) *Attorney, Agent, or Firm* — Hamre, Schumann, Mueller & Larson, P.C.

(57) ABSTRACT

A relief valve assembly includes a relief valve, a hollow shell disposed on the relief valve so as to form a relieving chamber, and a cap mounted to the hollow shell and closing off a distal end of the relief valve to an external environment. The hollow shell has a distal aperture and a proximal aperture, and the distal end of the relief valve is inserted into the hollow shell through the proximal aperture and protrudes through the distal aperture. The relief valve includes a relief port forming a fluid flow path between a valve chamber of the relief valve and the relieving chamber, and the hollow shell extends past the relief port along a longitudinal axis of the relief valve. The relief valve includes a slide member configured to move in response to an over-pressure condition, and a fluid vents from the valve chamber to the relieving chamber through the relief port.

17 Claims, 8 Drawing Sheets

(56) References Cited

U.S. PATENT DOCUMENTS

| | | | | |
|---|---|---|---|---|
| 3,709,255 A * | 1/1973 | Ciotti | F16K 1/303 | 137/460 |
| 3,776,264 A * | 12/1973 | Wenham | A01J 5/048 | 137/469 |
| 4,164,241 A * | 8/1979 | Kubo | F16K 27/12 | 137/377 |
| 4,616,763 A * | 10/1986 | Ruhl | B65D 41/62 | 137/377 |
| 5,165,445 A * | 11/1992 | Vertanen | F16K 17/196 | 137/493.6 |
| 5,803,115 A * | 9/1998 | Vertanen | F16K 17/19 | 137/493.2 |
| 6,019,125 A * | 2/2000 | Reverberi | F04B 53/1027 | 137/454.6 |
| 6,176,255 B1 * | 1/2001 | Robinson | F16B 37/14 | 137/327 |
| 6,971,406 B2 * | 12/2005 | Takahashi | F16K 15/026 | 137/538 |
| 8,276,613 B2 * | 10/2012 | Park | F16K 15/026 | 137/516.25 |
| 8,276,614 B2 * | 10/2012 | Park | F04B 27/1018 | 137/535 |
| 8,448,663 B2 * | 5/2013 | Jakubowski | F16K 15/063 | 137/526 |
| 2003/0127138 A1 * | 7/2003 | Zinelli | F16K 35/10 | 137/382 |
| 2006/0021661 A1 * | 2/2006 | Koch | F16K 15/026 | 137/543.19 |
| 2008/0018101 A1 * | 1/2008 | Roehner | F16K 15/025 | 285/133.4 |
| 2008/0029164 A1 * | 2/2008 | Ciochetti | F16K 24/06 | 137/526 |
| 2010/0000918 A1 * | 1/2010 | Crawford | B01D 35/147 | 210/130 |
| 2010/0132811 A1 * | 6/2010 | Cappeller | F15B 15/1457 | 137/377 |
| 2011/0114204 A1 * | 5/2011 | Okamoto | F16K 31/0634 | 137/535 |
| 2012/0073681 A1 * | 3/2012 | Balkus, Jr. | F16K 17/36 | 137/535 |

FOREIGN PATENT DOCUMENTS

| | | |
|---|---|---|
| TW | M381705 | 6/2010 |
| TW | I410575 | 10/2013 |

* cited by examiner

FIG. 8

RELIEF VALVE ASSEMBLY WITH ANTI-FROZEN SHIELDING HAT

TECHNICAL FIELD

The present disclosure relates to a relief valve assembly and more particularly, to a relief valve assembly with an anti-frozen shielding hat.

DISCUSSION OF THE BACKGROUND

In the storage and handling system of fluids or gases, it is common practice to provide the system with a relief valve to prevent the pressure from exceeding a predetermined value. In the case of liquid gases, this valve must be constructed so as to be operative at very low temperatures, particularly because of the fact that when such liquid gases are relieved, the flashing from the liquid to a gas results in considerable absorption of heat from surrounding elements and in a reduction of the temperature of the valve used for very low temperatures.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY

One aspect of the present disclosure provides a relief valve assembly with an anti-frozen shielding hat.

A relief valve assembly according to some embodiments of the present disclosure comprises a relief valve including a valve body having a valve chamber and a slide member configured to move inside the valve chamber; a hollow shell disposed to an outer surface of the valve body so as to form a relieving chamber between the relief valve and the hollow shell, wherein the hollow shell has a distal aperture and a proximal aperture, and a distal end of the valve body is inserted into the hollow shell through the proximal aperture and protrudes the distal aperture; and a cap mounted to the hollow shell and configured to close off the distal end of the valve body to an external environment. The relief valve includes at least one relief port forming a fluid flow path between the valve chamber and the relieving chamber, wherein the hollow shell extends past the at least one relief port along longitudinal axis of the valve body, and the slide member moves in response to an over-pressure condition, thereby allowing a fluid to vent from the valve chamber to the relieving chamber through the at least one relief port.

A relief valve assembly according to another embodiment of the present disclosure comprises a relief valve including a valve body having a valve chamber and a slide member disposed inside the valve chamber; and a shielding hat disposed to an outer surface of the valve body so as to form a relieving chamber between the relief valve and the shielding hat. The valve body includes at least one relief port forming a first flow path and at least one vent port forming a second flow path between the valve chamber and the relieving chamber, wherein the shielding hat extends past the at least one relief port and the at least one vent port along a longitudinal axis of the valve body, and the slide member is configured to move between the at least one relief port and the at least one vent port in response to an over-pressure condition, thereby allowing a first fluid to vent from the valve chamber to the relieving chamber through the at least one relief port below the slide member and a second fluid to vent from the valve chamber to the relieving chamber through the at least one vent port above the slider chamber.

Under an over-pressure condition, the slide member is moved upward inside the valve chamber by the first fluid, and the relief port of the relief valve forms a fluid flow path between the valve chamber and the relieving chamber, thereby allowing the first fluid to vent from the valve chamber to the relieving chamber through the relief port. When the relief valve is opened due to over-pressure, high-purity processed fluid will soon accumulate inside the relieving chamber so as to separate the valve body from air outside the relieving chamber. Thus, nothing can condense or freeze near the relief port during the ejecting process. Once the internal pressure reduces down to a normal pressure, the relief valve can fully close and isolate the processed fluid from air outside the relieving chamber.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a relief valve assembly with an anti-frozen shielding hat. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
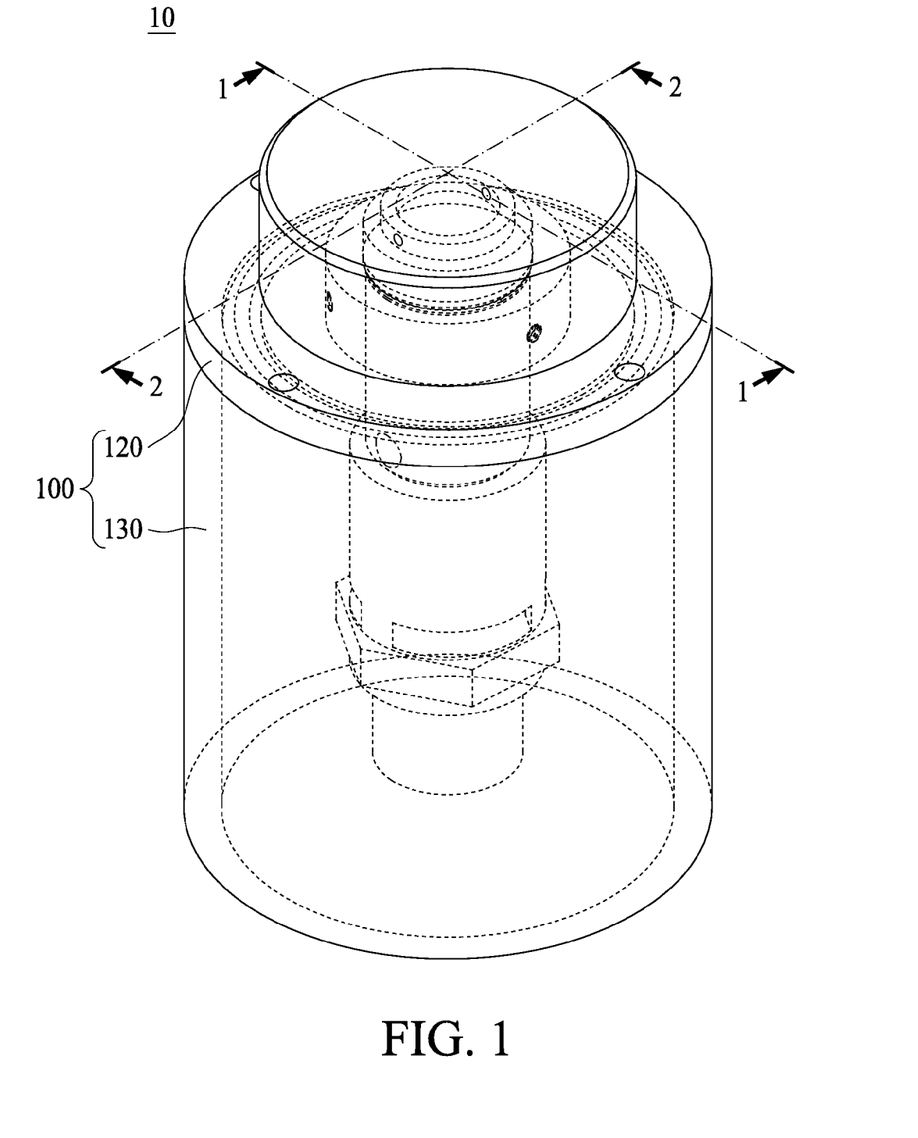
FIG. 1 is an assembled view of a relief valve assembly according to some embodiments of the present disclosure.
Figure 2:
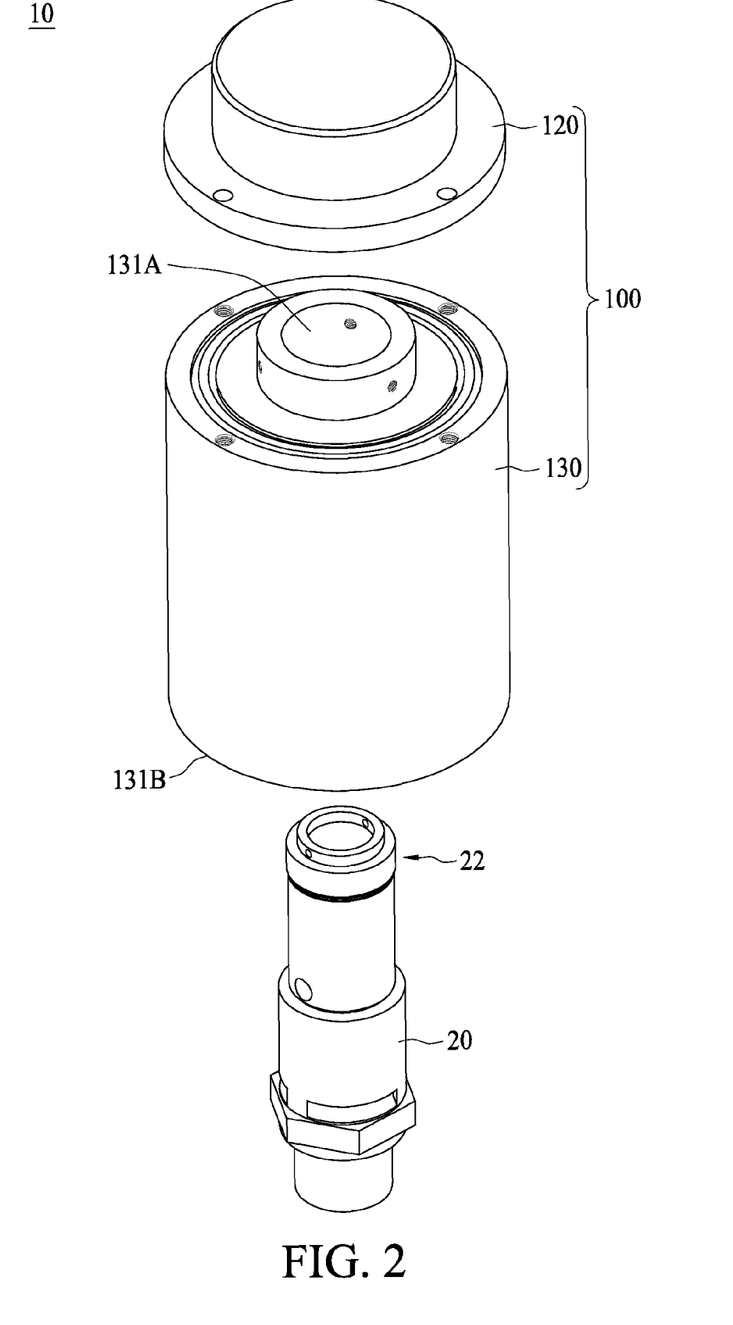
FIG. 2 is a disassembled view of the relief valve assembly in FIG. 1 according to some embodiments of the present disclosure.
Figure 3:
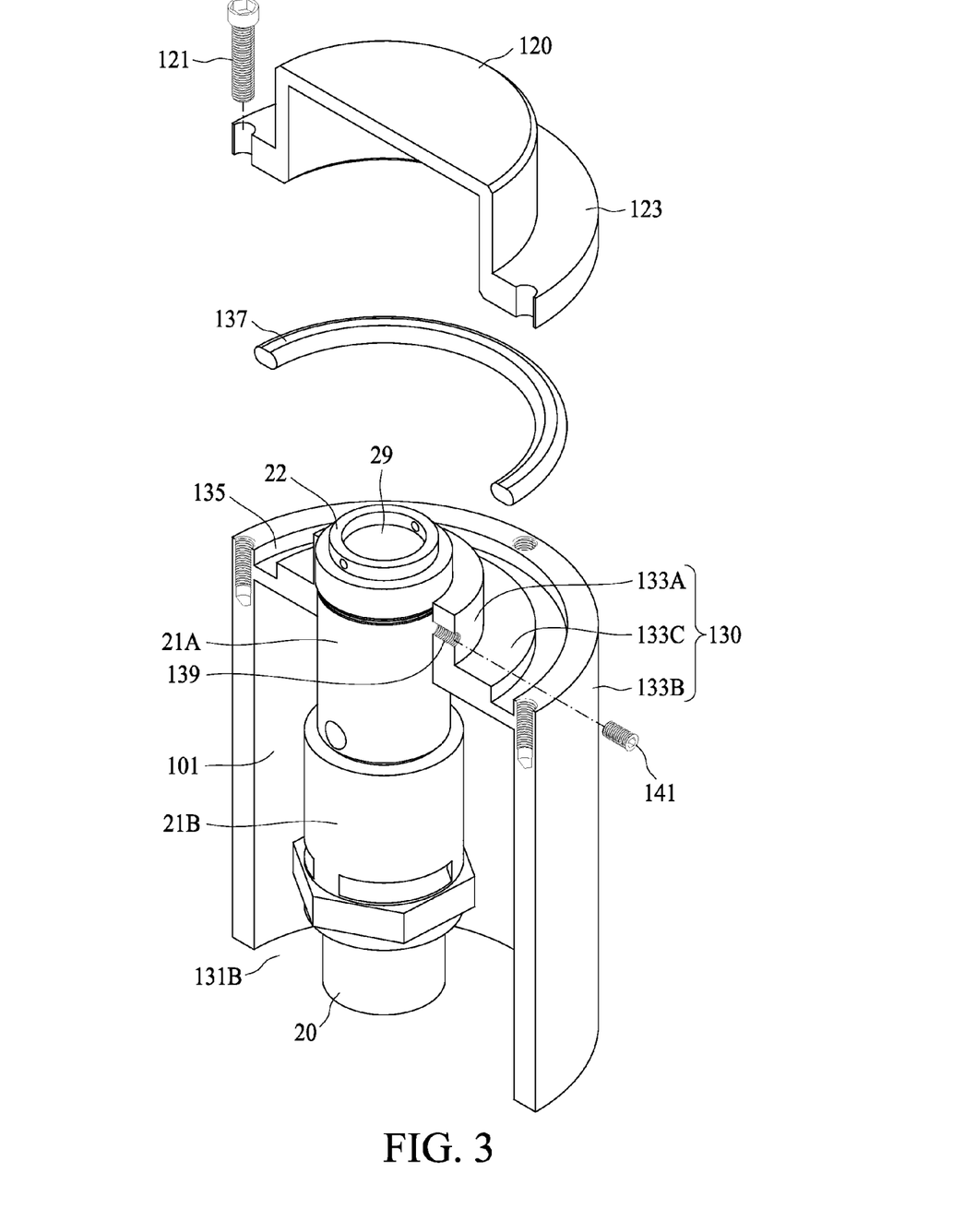
FIG. 3 is a schematic view of the relief valve assembly in FIG. 1, wherein an outer portion of the relief valve assembly is removed along a section line 1-1 in FIG. 1.

FIG. 1 is an assembled view of a relief valve assembly 10 according to some embodiments of the present disclosure, FIG. 2 is a disassembled view of the relief valve assembly 10 according to some embodiments of the present disclosure, and FIG. 3 is a schematic view of the relief valve assembly 10, wherein a portion of the relief valve assembly 10 is removed along a section line 1-1 in FIG. 1. Cryogenic fluids are processed, stored, and transferred at very low temperature. Once a cryogenic fluid is heated due to any unexpected condition, the high expansion rate of the cryogenic fluid causes high pressure and may damage the storage tank or the transfer line. To protect the related devices, the relief valve assembly 10 of the present disclosure may be installed on the storage tank and transfer lines, especially on the line end and in-between shut-off valves.

Referring to FIG. 2, in some embodiments of the present disclosure, the relief valve assembly 10 comprises a relief valve 20 and a shielding hat 100 disposed to an outer surface of the relief valve 20. In some embodiments of the present disclosure, the shielding hat 100 comprises a hollow shell 130 and a cap 120 mounted to the hollow shell 130, wherein the hollow shell 130 has a distal aperture 131A and a proximal aperture 131B, and a distal end 22 of the relief valve 20 is inserted into the hollow shell 130 through the proximal aperture 131B and protrudes through the distal aperture 131A, as shown in FIG. 3.

Figure 4:
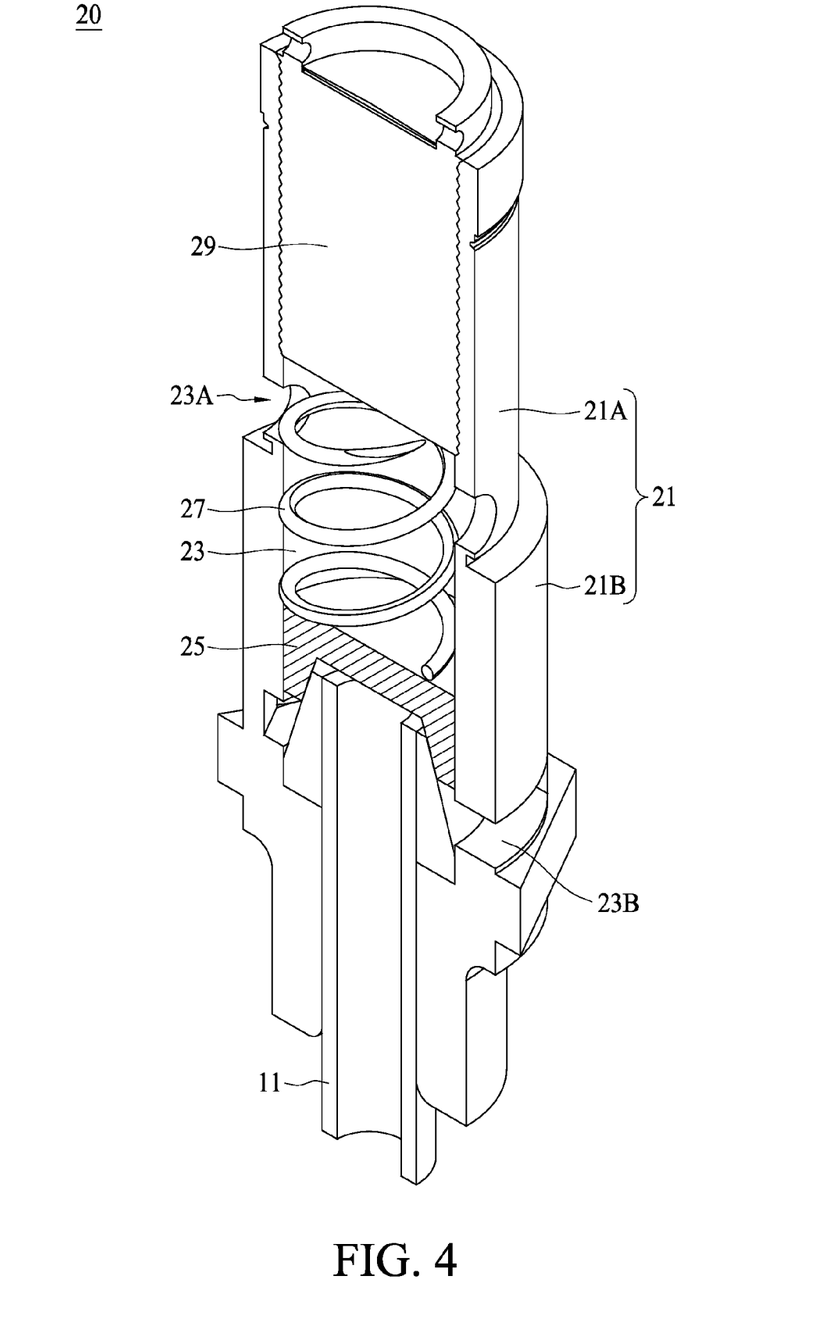
FIG. 4 is a schematic view showing a relief valve under a normal condition according to some embodiments of the present disclosure.
Figure 5:
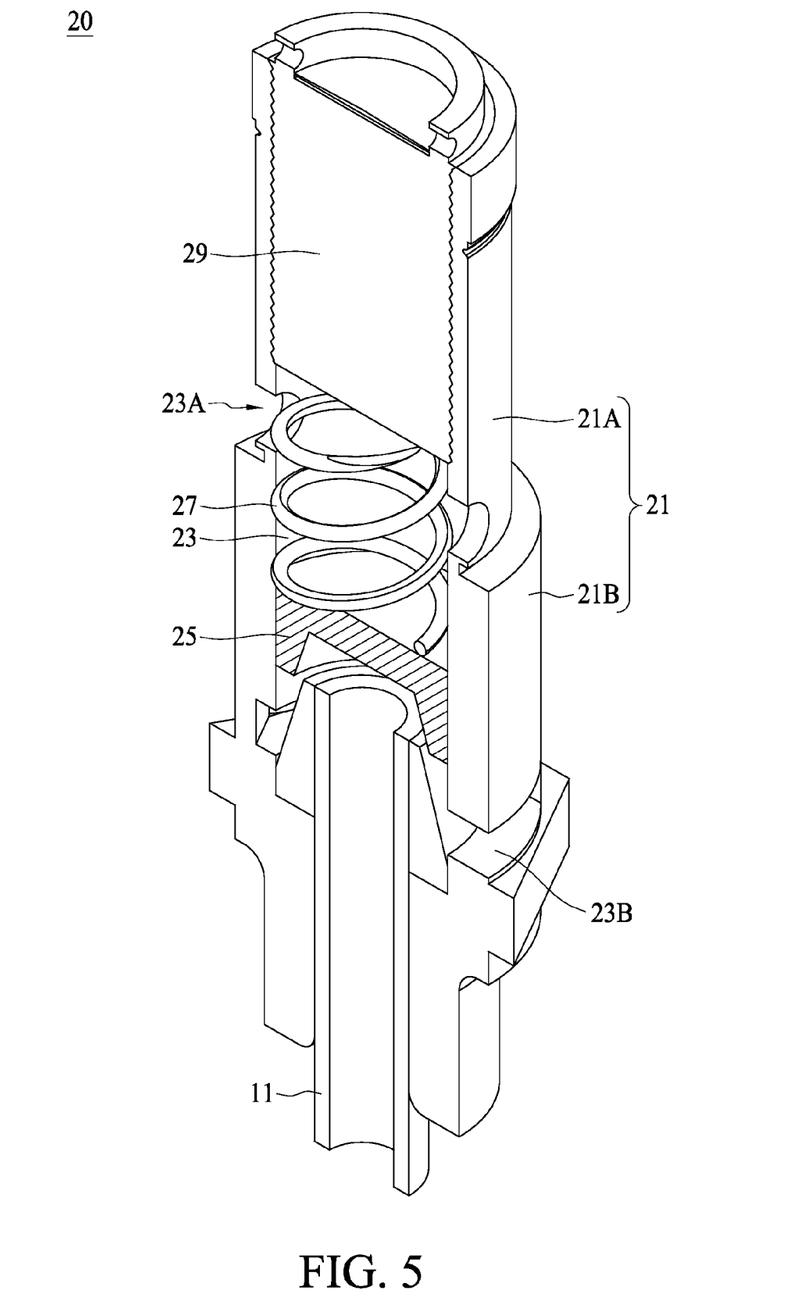
FIG. 5 is a schematic view of a relief valve under an over-pressure condition according to some embodiments of the present disclosure.

FIG. 4 is a schematic view showing the relief valve 20 under a normal condition according to some embodiments of the present disclosure, and FIG. 5 is a schematic view of the relief valve 20 under an over-pressure condition according to some embodiments of the present disclosure. In some embodiments of the present disclosure, the relief valve 20 includes a valve body 21 having a valve chamber 23 and a slide member 25 configured to move inside the valve chamber 23, and an elastic member 27 such as a spring disposed over the slide member 25. In some embodiments of the present disclosure, the diameter of the slide member 25 substantially fits the diameter of the valve chamber 23 so that there is substantially no gap between the slide member 25 and the valve body 21. As result, the cryogenic fluid cannot flow from the line 11 below the slide member 25 to an upper region of the valve chamber 23 above the slide member 25.

In some embodiments of the present disclosure, the relief valve 20 includes an adjusting bolt 29 having a plurality of first screws disposed over the elastic member 27, and an inner surface of the valve body 21 has a plurality of second screws configured to engage with the plurality of first screws. In some embodiments of the present disclosure, the elastic member 27 applies a bias force to the slide member 25, and the bias force can be altered by turning the adjusting bolt 29 in order to change the depth of insertion of the adjusting bolt 29, wherein the adjusting bolt 29 goes into the valve chamber 23 of the valve body 24, so as to further compress or relax the elastic member 27.

In some embodiments of the present disclosure, the relief valve 20 includes at least one vent port 23A at a distal portion 21A and at least one relief port 23B at a proximal portion 21B of the valve body 21. Under normal conditions, the pressure of the cryogenic fluid in the line 11 is not high enough to push the slide member 25 upward inside the valve chamber 23, and the outlet of the line 11 is sealed by the slide member 25. Consequently, the cryogenic fluid in the line 11 cannot vent to the outside of the valve chamber 23 through the relief port 23B, as shown in FIG. 4.

Referring to FIG. 5, under the over-pressure condition, the pressure of the cryogenic fluid in the line 11 is high enough to push the slide member 25 upward inside the valve chamber 23, the fluid (e.g. gas) above the slide member 25 inside the valve chamber 23 vents through the vent port 23A, and the cryogenic fluid in the line 11 below the slide member 25 vents from the valve chamber 23 to the outside through the relief port 23B. Without the vent port 23A, the fluid (e.g. gas) above the slide member 25 inside the valve chamber 23 would not be able to vent to the outside of the valve body 21, the slide member 25 cannot move upward inside the valve chamber 23, and the cryogenic fluid in the line 11 below the slide member 25 would not be able to vent from the valve chamber 23 to the outside through the relief port 23B.

A cryogenic plant produces cryogenic fluids from room-temperature gases, wherein some expansion devices such as turbines and pistons are used to extract heat out from the processing gas. These expansion devices are operated at high speeds and thus may be damaged if there are frozen impurities existing at the moving interface. Therefore, a cryogenic plant always requires a high-purity processed gas. Once the relief valve 20 opens due to high internal pressure in the line 11, the ejected fluid is extremely cold and cools down at the relief port 23B very quickly. The water vapor near the relief port 23B thus condenses into a liquid and soon becomes ice by freezing at the relief port 23B. Eventually the ice forms near the relief port 23B of the relief valve 20 and stops the relief port 23B from having a complete shut-off, even if the pressure of the cryogenic fluid in the line 11 reduces down to a normal condition. As a result, the relief valve 20 appears to be frozen, yet stays exposed to the external environment, thereby allowing many kinds of external gases to diffuse into the cryogenic system and cause several issues to occur.

Figure 6:
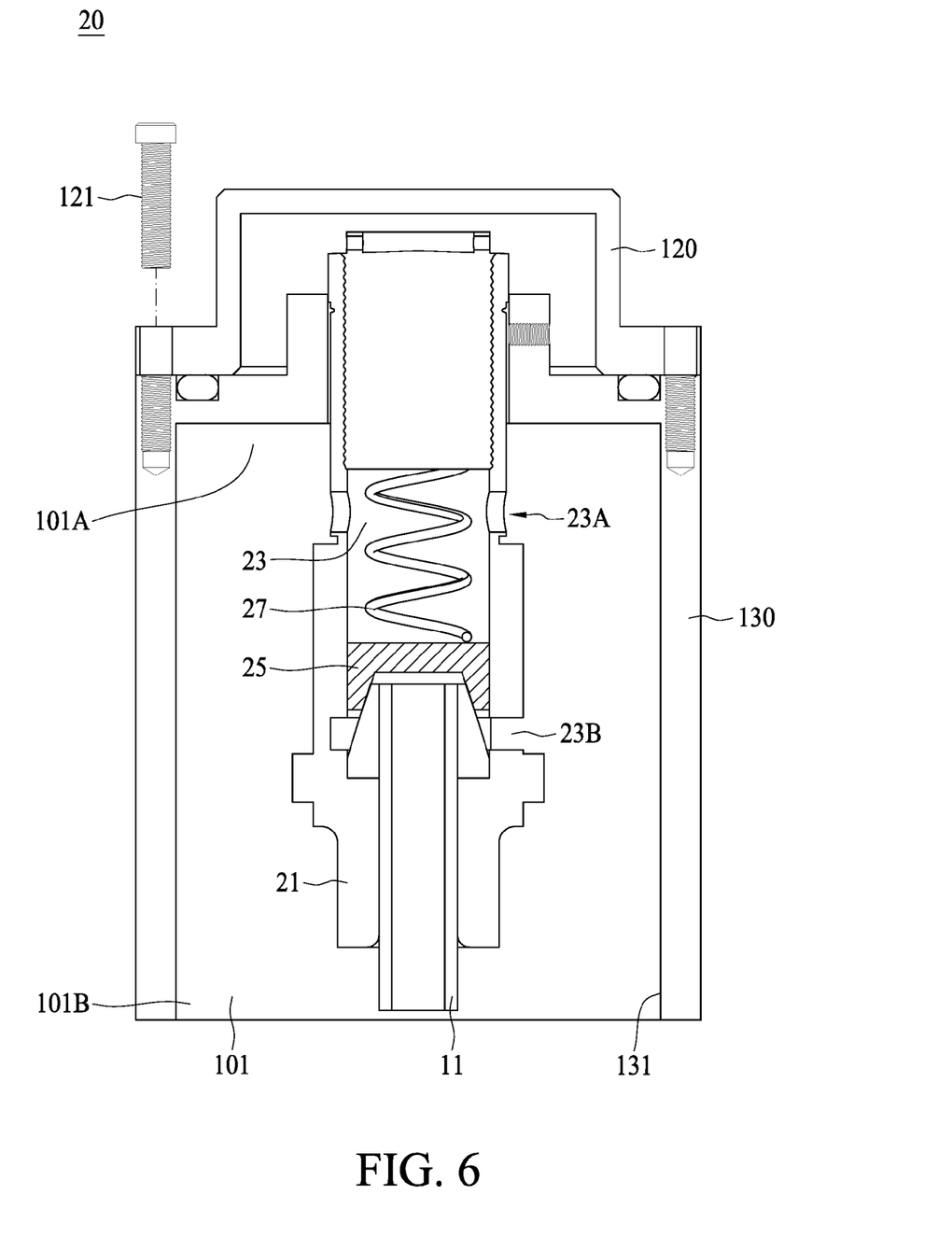
FIG. 6 is a cross-sectional view of the relief valve assembly under a normal condition along a section line 2-2 in FIG. 1 according to some embodiments of the present disclosure.

FIG. 6 is a cross-sectional view of the relief valve assembly 10 along a section line 2-2 in FIG. 1. In some embodiments of the present disclosure, the hollow shell 130 is disposed to an outer surface of the valve body 21 so as to form a relieving chamber 101 between the relief valve 21 and the hollow shell 130. In some embodiments of the present disclosure, the hollow shell 130 has an inner surface 131 juxtaposed opposite to the relief port 23B in order to deflect the cryogenic fluid relieving from the line 11 through the relief port 23B under the over-pressure condition. In some embodiments of the present disclosure, the hollow shell 130 extends past the relief port 23B along a longitudinal axis of the valve body 21. In some embodiments of the present disclosure, the relieving chamber 101 has a first end 101A and a second end 101B. The first end 101A is closer to the vent port 23A than to the relief port 23B, and the second end 101B is closer to the relief port 23B than to the vent port 23A. The vent port 23A is disposed in the first end 101A, and the relief port 23B is disposed in the second end 101B.

Referring to FIG. 6, under normal conditions, the pressure of the cryogenic fluid in the line 11 is not high enough to push the slide member 25 upward inside the valve chamber 23, and the outlet of the line 11 is sealed by the slide member 25. Consequently, the cryogenic fluid in the line 11 cannot vent to the relieving chamber 101 between the relief valve 21 and the hollow shell 130 through the relief port 23B.

Figure 7:
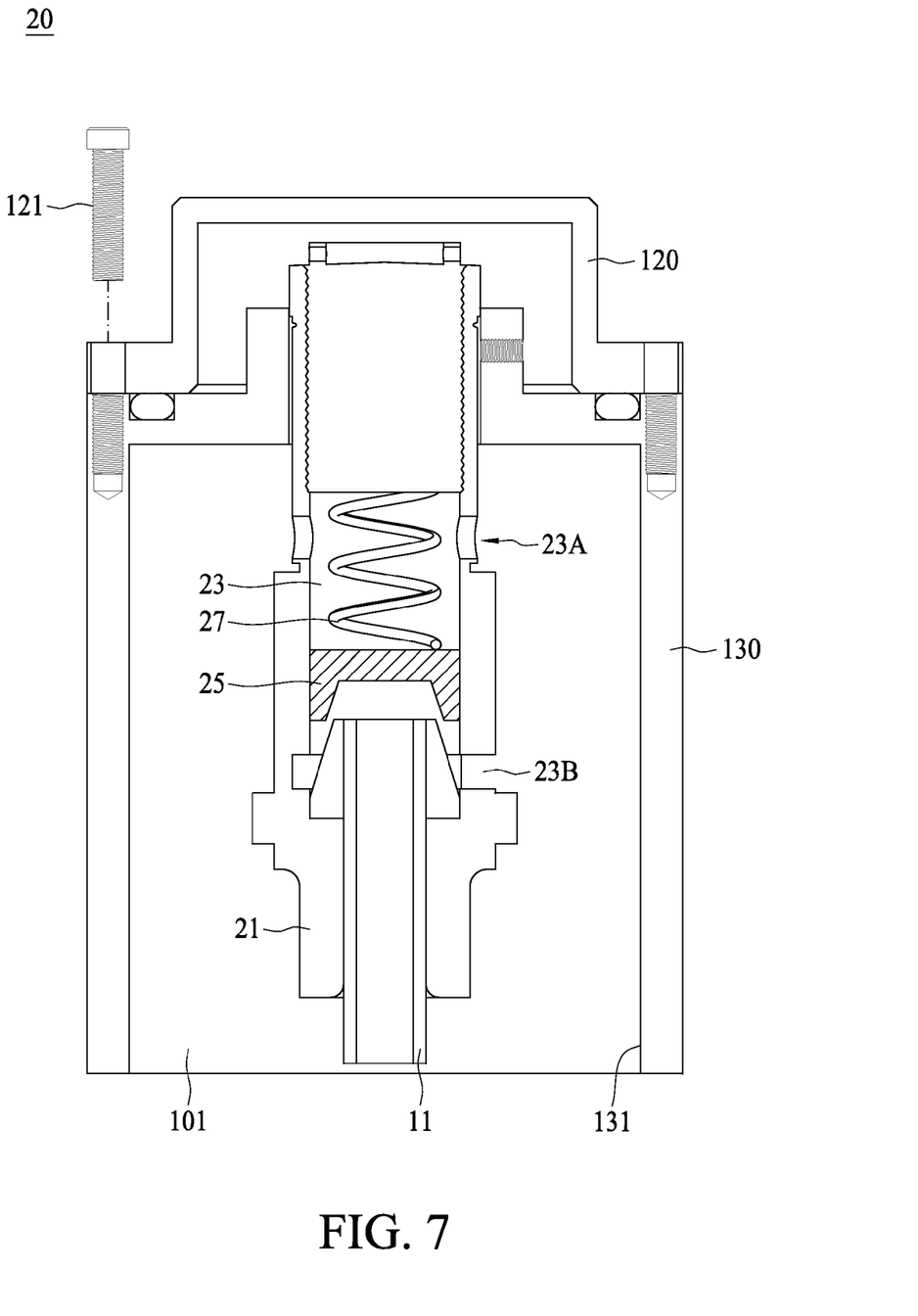
FIG. 7 is a cross-sectional view of the relief valve assembly under an over-pressure condition along a section line 2-2 in FIG. 1 according to some embodiments of the present disclosure.

Referring to FIG. 7, under the over-pressure condition, the slide member 25 is moved upward inside the valve chamber 23 by the cryogenic fluid in the line 11, and the relief port 23B of the relief valve forms a fluid flow path between the valve chamber 23 and the relieving chamber 101. Thus, the cryogenic fluid in the line 11 can vent from the valve chamber 23 to the relieving chamber 101 through the relief port 23B.

When the relief valve 20 is opened due to over-pressure, the high-purity processed fluid in the line 11 will soon accumulate inside the relieving chamber 101 so as to separate the valve body 21 from air outside of the relieving chamber 101. Thus, nothing can condense or freeze near the relief port 23B during the ejecting process. Once the internal pressure of the line 11 reduces down to normal pressure, the relief valve 20 can fully close and isolate the processed fluid from air outside of the relieving chamber 101. Consequently, the cryogenic system is thus secured.

Referring back to FIG. 3, the hollow shell 130 includes a narrow portion 133A, a wide portion 133B, and a connecting portion 133C connecting the wide portion 133B and the narrow portion 133A. In some embodiments of the present disclosure, the connecting portion 133C includes a ring-shaped depression 135 with a ring-shaped sealing member 137, such as an O-ring disposed therein.

In some embodiments of the present disclosure, the narrow portion 133A of the hollow shell 130 includes at least one screw hole 139 configured to engage with fasteners, such as bolts 141 to fasten the hollow shell 130 on the distal portion 21A of the valve body 21. In some embodiments of the present disclosure, the distal portion 21A of the valve body 21 has a first diameter, the proximal portion 21B of the valve body 21 has a second diameter larger than the first diameter, and the narrow portion 133A of the hollow shell 130 is mounted to the distal portion 21A. As a result, the shielding hat 100 can be easily assembled on the relief valve 20.

In some embodiments of the present disclosure, the cap 120 includes a flange portion 123 disposed on the connecting portion 133C of the hollow shell 130. In some embodiments of the present disclosure, the cap 120 is fastened on top of the hollow shell 130 by bolts 121 and configured to close off the distal end 22 of the valve body 21 to the external environment by using the ring-shaped sealing member 137 in the ring-shaped depression 135 of the connecting portion 133C. Consequently, under the over-pressure condition, the cryogenic fluid in the line 11 cannot vent to the external environment outside of the hollow shell 130 from the relieving chamber 101 through the distal end 22 of the relief valve 20.

In some embodiments of the present disclosure, the operators can simply open the cap 120 to turn the bolt 29 and thereby adjust the bias force applied by the elastic member 27 to the slide member 25, while the hollow shell 130 is still mounted to the relief valve 20 in order to deflect the cryogenic fluid relieving from the line 11 through the relief port 23B under the over-pressure condition.

Figure 8:
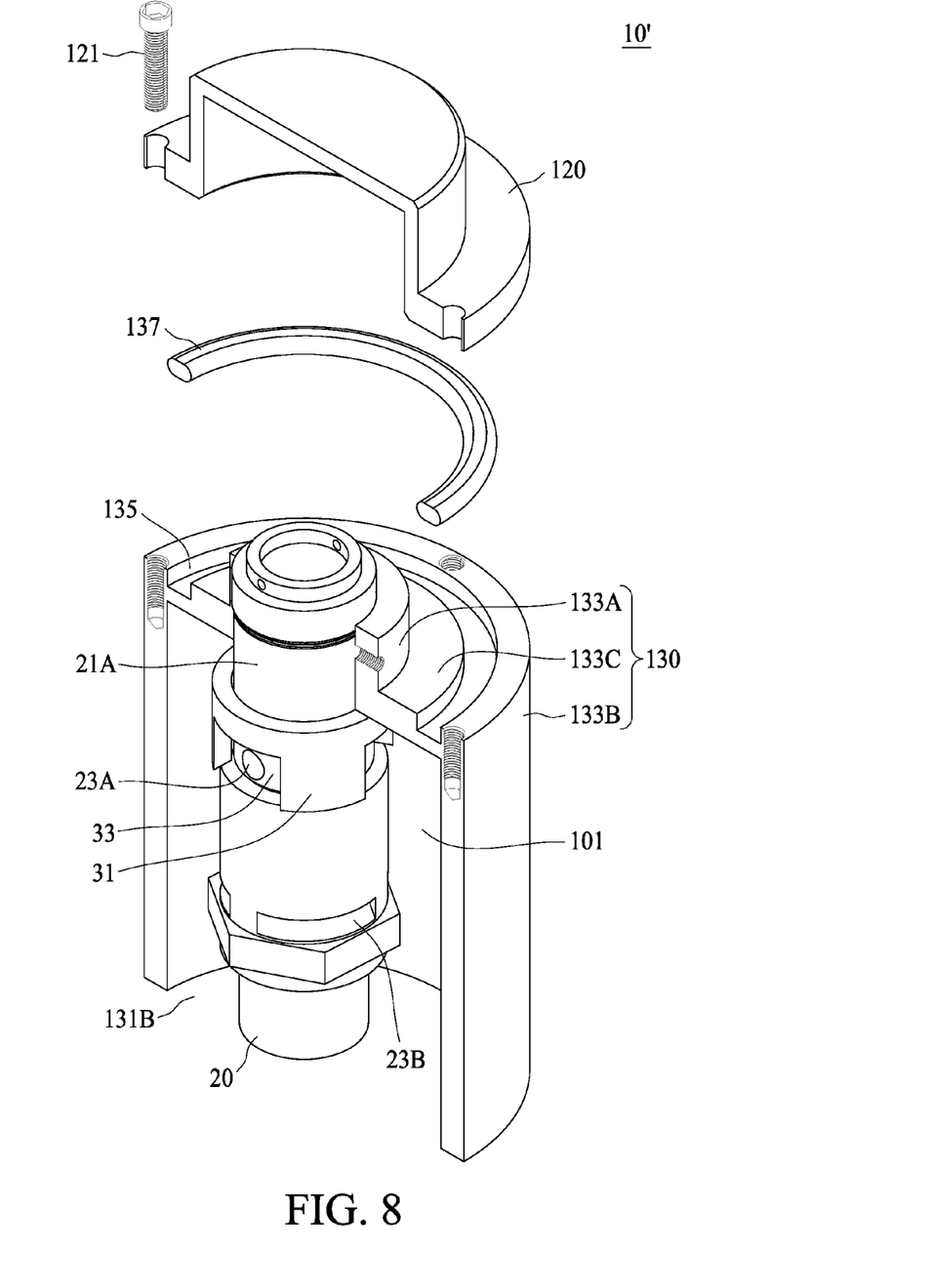
FIG. 8 is a schematic view of a relief valve assembly according to some embodiments of the present disclosure, wherein half of the shielding hat is removed.

FIG. 8 is a schematic view of a relief valve assembly 10' according to some embodiments of the present disclosure, wherein half of the shielding hat 100 is removed. In some embodiments of the present disclosure, the relief valve assembly 10' further comprises a supporting member 31 disposed on an outer surface of the distal portion 21A of the valve body 21, and the shielding hat 100 is disposed on the supporting member 31, wherein the supporting member 31 includes at least one slot 33 exposing the vent port 23A. The supporting member 31 is configured to block the narrow portion 133A of the hollow shell 130 from covering the vent port 23A of the valve body 21 when the shielding hat 100 is fastened to the relief valve 20.

In some embodiments, a relief valve assembly includes a relief valve, a hollow shell, and a cap; the relief body includes a valve body having a valve chamber and a slide member configured to move inside the valve chamber; the hollow shell is disposed to an outer surface of the valve body so as to form a relieving chamber between the relief valve and the hollow shell, wherein the hollow shell has a distal aperture and a proximal aperture, and a distal end of the valve body is inserted into the hollow shell through the proximal aperture and protrudes the distal aperture; and the cap is mounted to the hollow shell and configured to close off the distal end of the valve body to an external environment. The relief valve includes at least one relief port forming a fluid flow path between the valve chamber and the relieving chamber, wherein the hollow shell extends past the at least one relief port along a longitudinal axis of the valve body, and the slide member moves in response to an over-pressure condition, thereby allowing a fluid to vent from the valve chamber to the relieving chamber through the at least one relief port.

In some embodiments, a relief valve assembly includes a relief valve and a shielding hate; the relief valve includes a valve body having a valve chamber and a slide member disposed inside the valve chamber; and the shielding hat is disposed to an outer surface of the valve body so as to form a relieving chamber between the relief valve and the shielding hat. The valve body includes at least one relief port forming a first flow path and at least one vent port forming a second flow path between the valve chamber and the relieving chamber, wherein the shielding hat extends past the at least one relief port and the at least one vent port along a longitudinal axis of the valve body, and the slide member is configured to move between the at least one relief port and the at least one vent port in response to an over-pressure condition, thereby allowing a first fluid to vent from the valve chamber to the relieving chamber through the at least one relief port below the slide member and a second fluid to vent from the valve chamber to the relieving chamber through the at least one vent port above the slider chamber.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A relief valve assembly, comprising:
a relief valve including a valve body having a valve chamber and a slide member configured to move inside the valve chamber;
a hollow shell disposed to an outer surface of the valve body in order to form a relieving chamber between the relief valve and the hollow shell, wherein the hollow shell has a distal aperture and a proximal aperture, and a distal end of the valve body is inserted into the hollow shell through the proximal aperture and protrudes through the distal aperture; and
a cap mounted to the hollow shell and configured to close off the distal end of the valve body to an external environment;
wherein the relief valve includes at least one relief port forming a fluid flow path between the valve chamber and the relieving chamber, the hollow shell extends past the at least one relief port along a longitudinal axis of the valve body, and the slide member moves in response to an over-pressure condition, thereby allowing a fluid to vent from the valve chamber to the relieving chamber through the at least one relief port;
wherein the hollow shell includes a wide portion, a narrow portion, and a connecting portion connecting the wide portion and the narrow portion; and
wherein the connecting portion includes a ring-shaped depression with a ring-shaped sealing member disposed therein.

2. The relief valve assembly of claim 1, wherein the hollow shell has an inner surface juxtaposed opposite to the at least one relief port in order to deflect the fluid relieving from the at least one relief port.

3. The relief valve assembly of claim 1, wherein the cap includes a flange portion disposed on the connecting portion.

4. The relief valve assembly of claim 1, wherein the relief valve includes a distal portion having a first diameter and a proximal portion having a second diameter larger than the first diameter, and the narrow portion is mounted to the distal portion.

5. The relief valve assembly of claim 4, wherein the narrow portion includes at least one screw hole configured to engage with a screw to fasten the hollow shell on the distal portion.

6. The relief valve assembly of claim 1, wherein the relief valve includes a distal portion having a first diameter and a proximal portion having a second diameter larger than the first diameter, and the at least one relief port is disposed in the proximal portion.

7. The relief valve assembly of claim 1, wherein the relief valve includes an elastic member disposed over the slide member.

8. The relief valve assembly of claim 7, wherein the relief valve includes an adjusting bolt having a plurality of first screws disposed over the elastic member, and an inner surface of the valve body has a plurality of second screws configured to engage with the plurality of first screws.

9. A relief valve assembly, comprising:
a relief valve including a valve body having a valve chamber and a slide member disposed inside the valve chamber; and
a shielding hat disposed to an outer surface of the valve body so as to form a relieving chamber between the relief valve and the shielding hat;
wherein the valve body includes at least one relief port forming a first flow path and at least one vent port forming a second flow path between the valve chamber and the relieving chamber, the shielding hat extends past the at least one relief port and the at least one vent port along a longitudinal axis of the valve body, and the slide member is configured to move between the at least one relief port and the at least one vent port in response to an over-pressure condition, thereby allowing a first fluid to vent from the valve chamber to the relieving chamber through the at least one relief port below the slide member and a second fluid to vent from the valve chamber to the relieving chamber through the at least one vent port above the slide member;
wherein the shielding hat includes a wide portion, a narrow portion, and a connecting portion connecting the wide portion and the narrow portion;
wherein the shielding hat comprises a hollow shell disposed to an outer surface of the valve body and a cap mounted to the hollow shell, and the cap is configured to close off the distal end of the valve body to an external environment; and
wherein the connecting portion includes a ring-shaped depression with a ring-shaped sealing member disposed in the ring-shaped depression, and the cap includes a flange portion disposed on the connecting portion.

10. The relief valve assembly of claim 9, wherein the shielding hat has an inner surface juxtaposed opposite to the at least one relief port in order to deflect the first fluid relieving from the at least one relief port.

11. The relief valve assembly of claim, 9 wherein the relief valve includes a distal portion having a first diameter and a proximal portion having a second diameter larger than the first diameter, and the narrow portion is mounted to the distal portion.

12. The relief valve assembly of claim 11, wherein the narrow portion includes at least one screw hole configured to engage with a screw to fasten the shielding hat on the distal portion.

13. The relief valve assembly of claim 9, wherein the relief valve includes a distal portion having a first diameter and a proximal portion having a second diameter larger than the first diameter, the at least one relief port is disposed in the proximal portion, and the at least one vent port is disposed in the distal portion.

14. The relief valve assembly of claim 13, further comprising a supporting member disposed on an outer surface of the distal portion, the shielding hat is disposed on the supporting member, and the supporting member includes at least one slot exposing the at least one vent port.

15. The relief valve assembly of claim 10, wherein the relief valve includes an elastic member disposed over the slide member.

16. The relief valve assembly of claim 15, wherein the relief valve includes an adjusting bolt having a plurality of first screws disposed over the elastic member, and an inner surface of the valve body has a plurality of second screws configured to engage with the plurality of first screws.

17. The relief valve assembly of claim 10, wherein the relieving chamber has a first end and a second end, the first end is closer to the at least one vent port than to the at least one relief port, the second end is closer to the at least one relief port than to the at least one vent port such that the second fluid venting from the at least one vent port pushes the first fluid venting from the at least one relief port in a direction from the first end to the second end.

* * * * *